US009188095B2

(12) United States Patent
Matsumoto et al.

(10) Patent No.: US 9,188,095 B2
(45) Date of Patent: Nov. 17, 2015

(54) INTAKE AND EXHAUST SYSTEM FOR MULTI-CYLINDER ENGINE

(75) Inventors: Takamasa Matsumoto, Higashihiroshima (JP); Mikihito Fujii, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 289 days.

(21) Appl. No.: 13/978,357

(22) PCT Filed: Jan. 10, 2012

(86) PCT No.: PCT/JP2012/000091
§ 371 (c)(1),
(2), (4) Date: Jul. 3, 2013

(87) PCT Pub. No.: WO2012/098833
PCT Pub. Date: Jul. 26, 2012

(65) Prior Publication Data
US 2013/0306025 A1    Nov. 21, 2013

(30) Foreign Application Priority Data
Jan. 20, 2011  (JP) .................................. 2011-009758

(51) Int. Cl.
*F02D 13/00*       (2006.01)
*F02B 27/00*       (2006.01)
(Continued)

(52) U.S. Cl.
CPC .............. *F02M 63/00* (2013.01); *F01N 13/10* (2013.01); *F02B 27/04* (2013.01);
(Continued)

(58) Field of Classification Search
CPC ..... F01N 13/10; F01N 13/08; F01N 2260/14; F01N 2260/16; F01N 2340/02; F02D 13/0261; F02B 27/04

USPC ......... 123/90.15, 345–348; 60/281, 312, 313, 60/322, 323, 324
See application file for complete search history.

(56) References Cited

U.S. PATENT DOCUMENTS

| 5,216,883 A | 6/1993 | Flugger |
| 2003/0167759 A1 | 9/2003 | Ashida et al. |

(Continued)

FOREIGN PATENT DOCUMENTS

| AT | 501797 B1 | 2/2008 |
| CN | 1443931 A | 9/2003 |

(Continued)

OTHER PUBLICATIONS

An Office Action issued by the German Patent Office on Nov. 27, 2014, which corresponds to German Patent Application No. 11 2012 000 534.1 and is related to U.S. Appl. No. 13/978,357; with English language translation.

(Continued)

*Primary Examiner* — Hai Huynh
(74) *Attorney, Agent, or Firm* — Studebaker & Brackett PC

(57) ABSTRACT

A multi-cylinder engine intake and exhaust having a plurality of independent exhaust passages each connected to an exhaust port in a respective one of a plurality of cylinders, a collecting pipe connected to downstream ends of the plurality of independent exhaust passages, and a volume-enlarged portion provided downstream with respect to the collecting pipe. Each of at least a downstream portion of each of the plurality of independent exhaust passages and at least an upstream portion of the collecting pipe is formed such that a cross-sectional area thereof gradually decreases toward a downstream direction. The volume-enlarged portion is formed such that a cross-sectional area thereof is relatively increased so as to cause a positive pressure wave of exhaust gas reaching the volume-enlarged portion to be reflected and converted to a negative pressure wave.

12 Claims, 9 Drawing Sheets

(51) Int. Cl.
  *F02M 63/00* (2006.01)
  *F01N 13/10* (2010.01)
  *F02B 27/04* (2006.01)
  *F02D 13/02* (2006.01)

(52) U.S. Cl.
  CPC ........ *F02D 13/0261* (2013.01); *F01N 2260/14* (2013.01); *F01N 2260/16* (2013.01); *F01N 2340/02* (2013.01); *Y02T 10/146* (2013.01); *Y02T 10/18* (2013.01)

(56) References Cited

U.S. PATENT DOCUMENTS

| | | |
|---|---|---|
| 2004/0129238 A1 | 7/2004 | Nishida |
| 2006/0005535 A1 | 1/2006 | Ashida et al. |
| 2009/0094978 A1 | 4/2009 | Yamagata et al. |
| 2011/0054760 A1 | 3/2011 | Ogawa et al. |

FOREIGN PATENT DOCUMENTS

| | | |
|---|---|---|
| DE | 3926921 A1 | 9/1990 |
| EP | 1118750 A1 | 7/2001 |
| GB | 2229224 A | 9/1990 |
| JP | 06-500380 A | 1/1994 |
| JP | 11-022499 A | 1/1999 |
| JP | 2000-314322 A | 11/2000 |
| JP | 2004-211614 A | 7/2004 |
| JP | 2009-097355 A | 5/2009 |
| JP | 2010-084529 A | 4/2010 |
| JP | 2010-084532 A | 4/2010 |
| WO | 2010/092678 A1 | 8/2010 |

OTHER PUBLICATIONS

Heinz Grohe; "Otto- und Dieselmotoren"; 1987; p. 129; 8th edition; VOGEL Buchverlag, Würzburg, Germany.

The first Office Action issued by the Chinese Patent Office on Dec. 31, 2014, which corresponds to Chinese Patent Application No. 201280006021.3 and is related to U.S. Appl. No. 13/978,357; with English language summary.

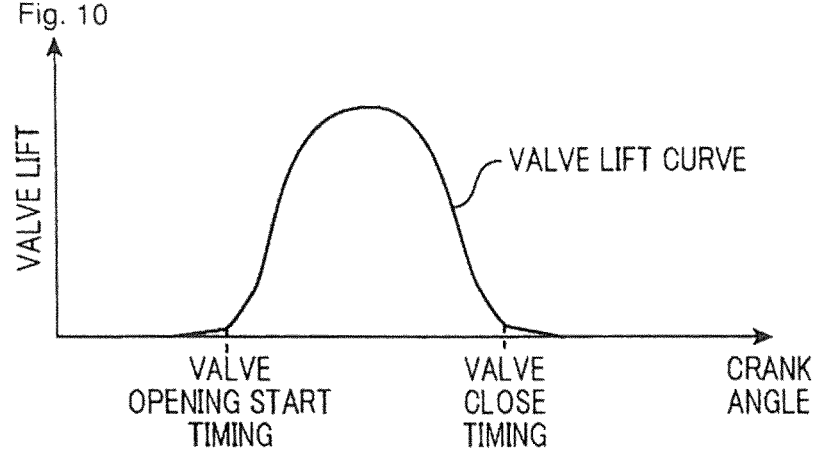

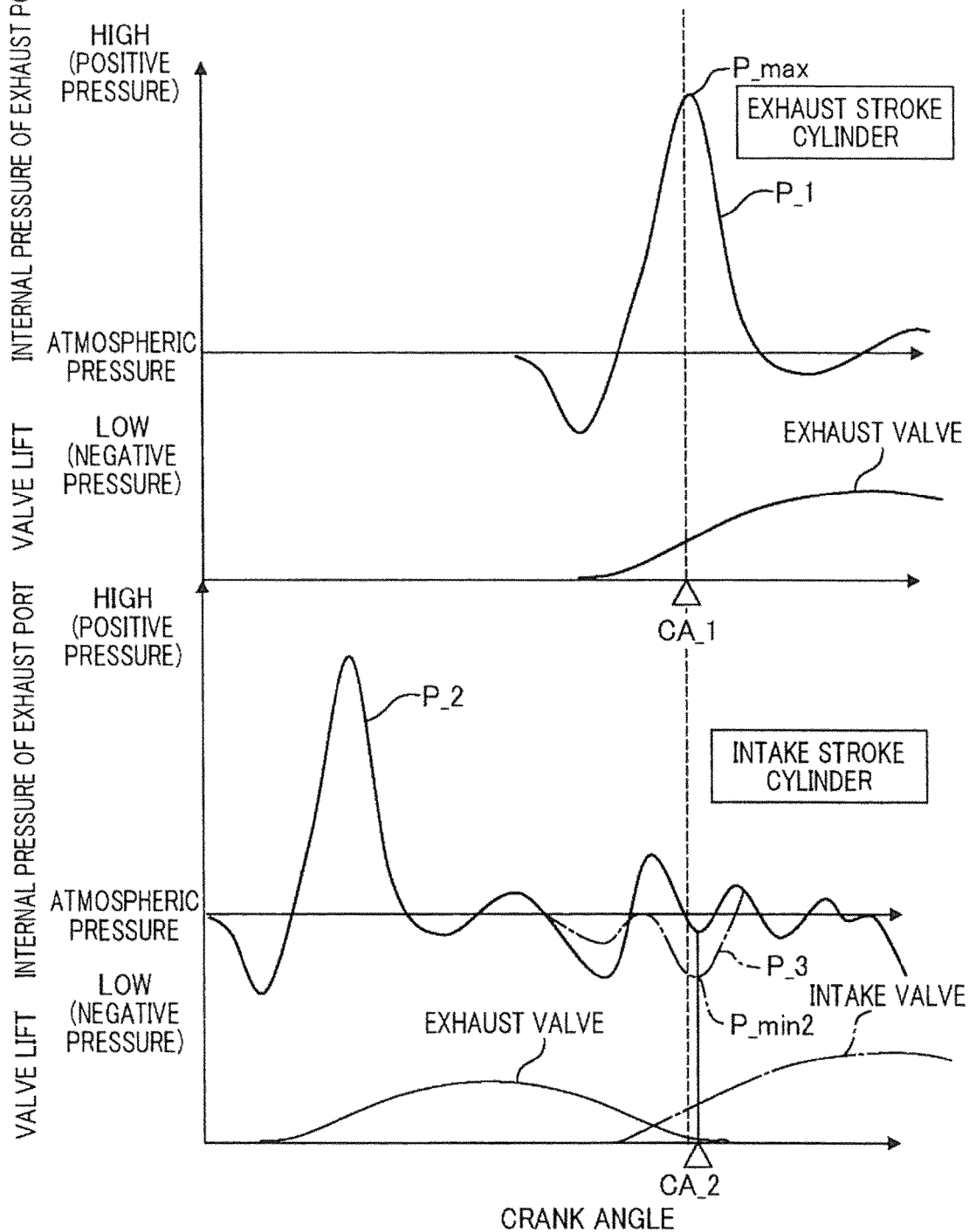

INTAKE AND EXHAUST SYSTEM FOR MULTI-CYLINDER ENGINE

TECHNICAL FIELD

The present invention relates to an intake and exhaust system for a multi-cylinder engine to be provided in an automobile or the like.

BACKGROUND ART

Heretofore, in the field of engines for automobiles and others, developments on an intake and exhaust system for increasing engine power output have been promoted.

For example, the following Patent Literature (PTL) 1 discloses an intake and exhaust system with a turbo supercharger (turbocharger), wherein the system comprises a plurality of independent exhaust passages connected to respective cylinders in a mutually independent manner, a collecting portion provided upstream of the turbocharger and at which the independent exhaust passages are merged together, and a valve provided in the collecting portion and capable of changing a cross-sectional area of each of the independent exhaust passages. In this system, when the cross-sectional areas of the independent exhaust passages is reduced by the valve, exhaust gas of a certain cylinder being in an exhaust stroke is ejected from an associated one of the independent exhaust passages into the collecting portion at relatively high speed, so that a so-called "ejector effect" can be expected in which a negative pressure generated around the ejected gas flow is applied to the remaining independent exhaust passages. Upon exerting the ejector effect, exhaust gas in the remaining independent exhaust passages is sucked toward a downstream direction, so that it becomes possible to increase an amount of gas to be supplied to the turbocharger, and thereby improve engine power output.

CITATION LIST

Patent Literature

[PTL 1] JP 2009-97335A

SUMMARY OF INVENTION

Technical Problem

In the field of engines for automobiles and others, there still exists a strong need for improving the engine power output, specifically for further increasing the engine power output with a simple configuration.

In view of the above circumstances, it is an object of the present invention to provide a multi-cylinder engine intake and exhaust system capable of increasing engine power output with a simple configuration.

Solution to Problem

In order to achieve the above object, the present invention provides an intake and exhaust system for a multi-cylinder engine having a plurality of cylinders each provided with an intake port, an exhaust port, an intake valve capable of opening and closing the intake port, and an exhaust valve capable of opening and closing the exhaust port. The intake and exhaust system comprises: a plurality of independent exhaust passages each connected to the exhaust port in a respective one of the plurality of cylinders, or the exhaust ports in two or more of the plurality of cylinders, whose exhaust strokes are not successive with respect to each other; a collecting pipe connected to downstream ends of the plurality of independent exhaust passages to allow exhaust gas passing through the plurality of independent exhaust passages to be collected together; a volume-enlarged portion provided downstream with respect to the collecting pipe; and valve drivers capable of driving the intake valve and the exhaust valve in each of the plurality of cylinders. Among the plurality of independent exhaust passages, at least two connected to respective ones of two of the plurality of cylinders, whose exhaust strokes are successive with respect to each other, are connected to the collecting pipe at mutually adjacent positions. The valve drivers are operable, at least in a low engine speed region where engine speed is equal to or less than a preset reference engine speed, to drive the intake valve and the exhaust valve in each of the plurality of cylinders in such a manner that a valve opening period of the intake valve and a valve opening period of the exhaust valve in each of the plurality of cylinders overlap with each other for a predetermined overlap period, and the exhaust valve in a certain one of the plurality of cylinders starts opening during the overlap period in a preceding one of the remaining cylinders, whose exhaust stroke immediately precedes that of the certain cylinder. Each of at least an upstream portion of the collecting pipe and at least a downstream portion of each of the plurality of independent exhaust passages is formed such that a cross-sectional area thereof gradually decreases toward a downstream direction. The volume-enlarged portion is formed such that a cross-sectional area thereof is increased as compared to a passage upstream with respect to the volume-enlarged portion, so as to cause a positive pressure wave of exhaust gas which reaches the volume-enlarged portion after being discharged from each of the plurality of cylinders, to be reflected and converted to a negative pressure wave. A length between an upstream end of the collecting pipe and an upstream end of the volume-enlarged portion is set to a dimension which allows a negative pressure wave generated through a phenomenon that a positive pressure wave of exhaust gas discharged from a certain one of the plurality of cylinders is reflected by the volume-enlarged portion at least at a predetermined engine speed equal to or less than the preset reference engine speed, to reach the exhaust port in a preceding one of the remaining cylinders, whose exhaust stroke immediately precedes that of the certain cylinder, during the overlap period in the preceding cylinder.

BRIEF DESCRIPTION OF DRAWINGS

FIG. 10 is an explanatory chart illustrating valve opening and closing timings of intake and exhaust valves in the embodiment of the present invention.

FIG. 11 is an explanatory chart illustrating effects of the present invention.

DESCRIPTION OF EMBODIMENTS

With reference to the drawings, a multi-cylinder engine exhaust system according to one embodiment of the present invention will be described.

Figure 1:
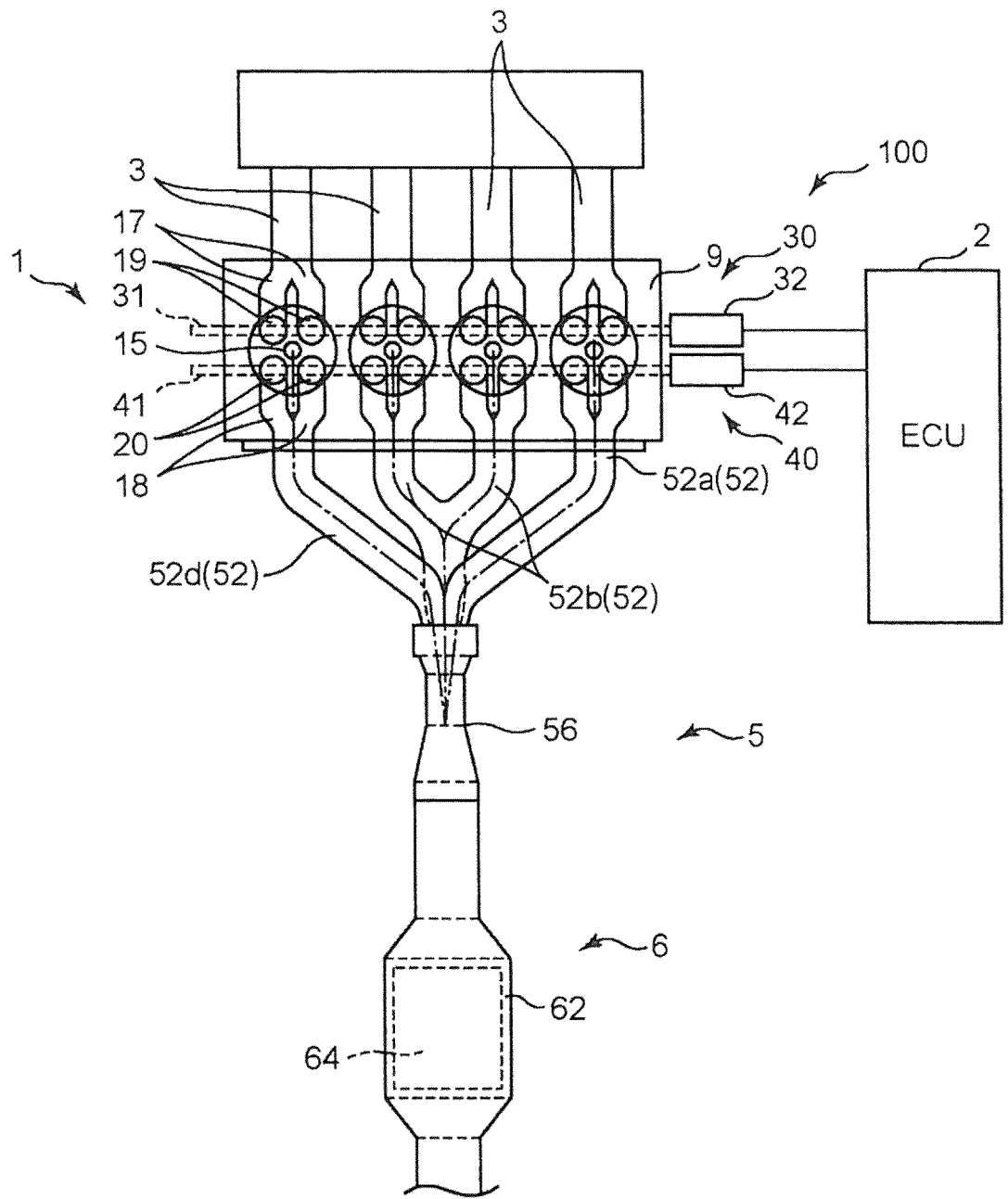
FIG. 1 is a schematic diagram illustrating an engine system having a multi-cylinder engine intake and exhaust system according to one embodiment of the present invention.
Figure 2:
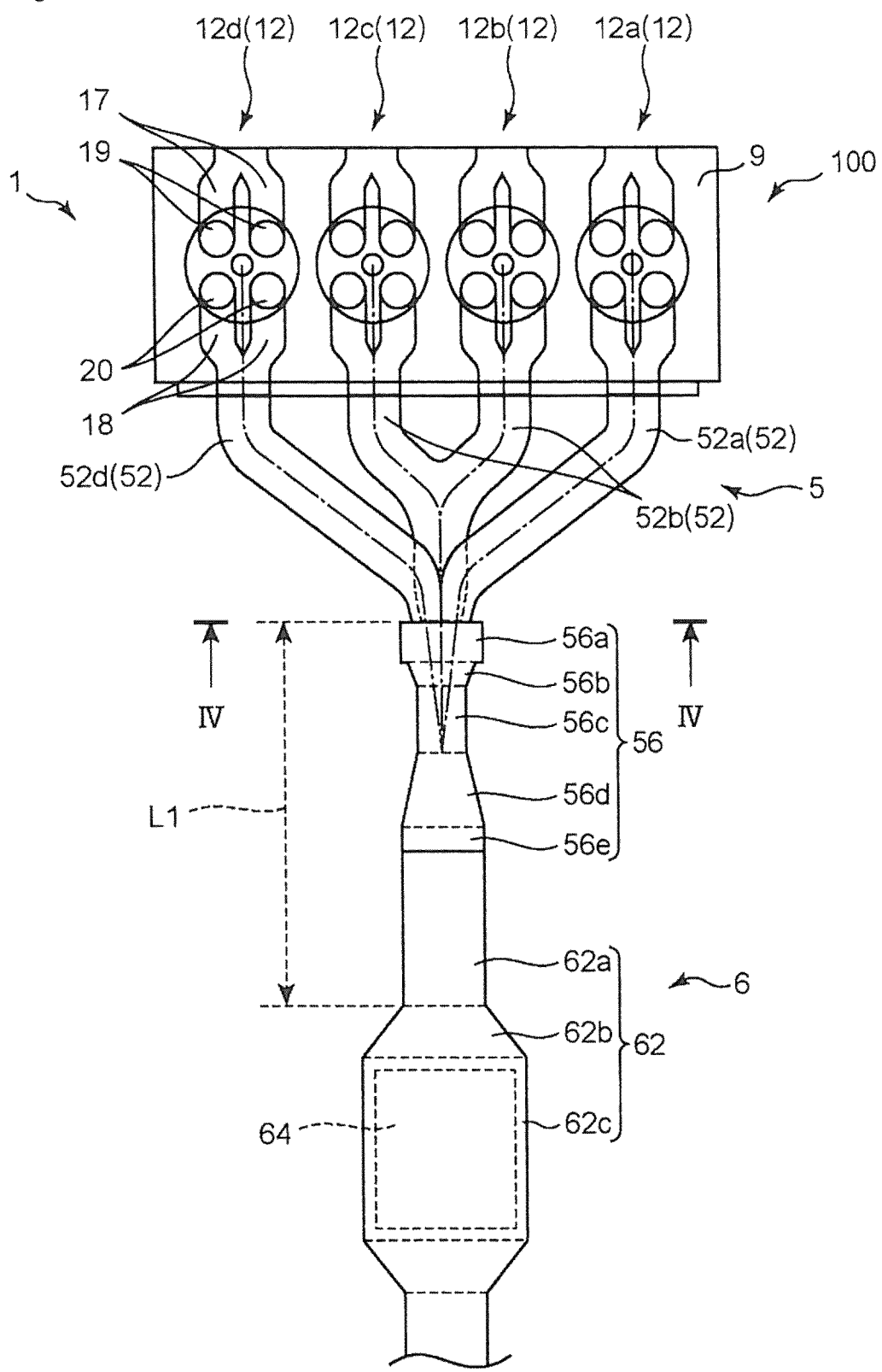
FIG. 2 is a fragmental enlarged view of the engine system in FIG. 1.
Figure 3:
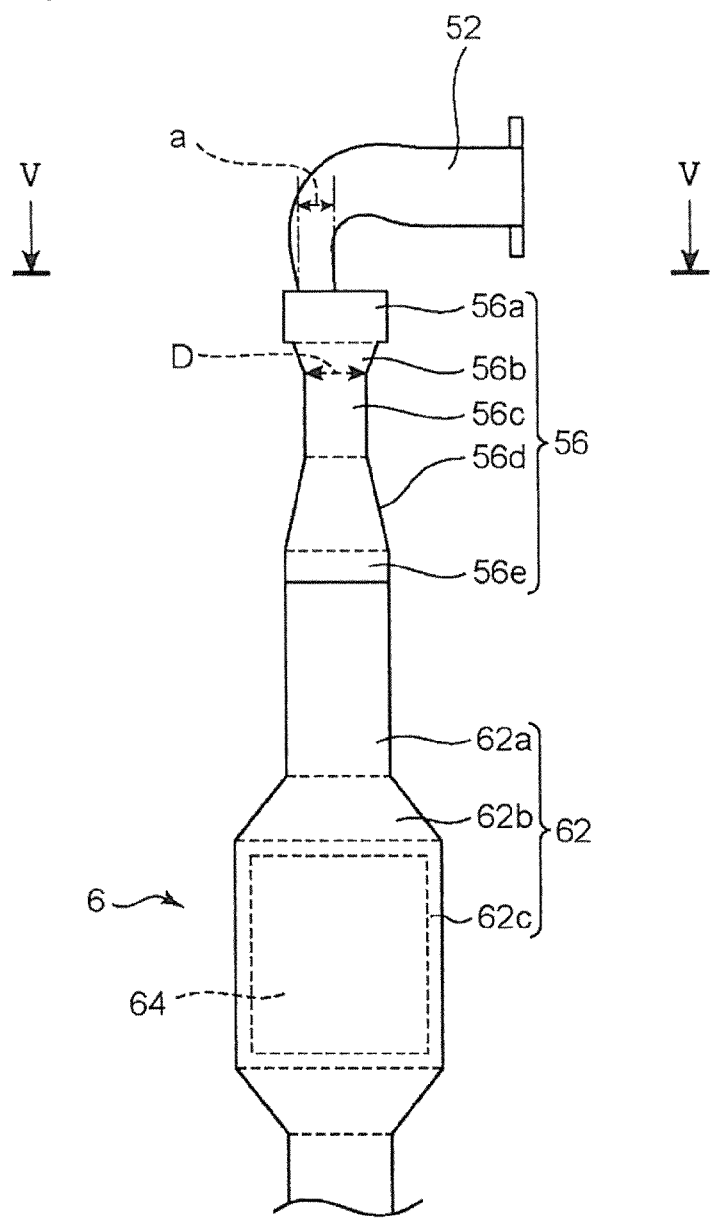
FIG. 3 is a schematic side view of the engine system in FIG. 2.

FIG. 1 is a schematic diagram illustrating an engine system 100 having the multi-cylinder engine intake and exhaust system. FIG. 2 is a fragmental enlarged view of the engine system in FIG. 1, and FIG. 3 is a schematic side view of the engine system in FIG. 2. The engine system 100 comprises: an engine body 1 having a cylinder head 9 and a cylinder block (illustration is omitted); an ECU 2 for engine control; a plurality of intake pipes 3 connected to the engine body 1; an exhaust manifold 5 connected to the engine body 1; and a catalytic device 6 connected to the exhaust manifold 5.

The cylinder head 9 and the cylinder block are internally formed with a plurality of cylinders 12 (see FIG. 2) in each of which a piston is fittingly inserted. In this embodiment, the engine body 1 is an inline four-cylinder engine in which four cylinders 12 are formed inside the cylinder head 9 and the cylinder block in such a manner that they are arranged side-by-side in line. Specifically, a first cylinder 12a, a second cylinder 12b, a third cylinder 12c and a fourth cylinder 12d are formed in this order from the right side in FIG. 2. The cylinder head 9 is provided with four spark plugs 15 each exposed to a respective one of four combustion chambers defined above the respective pistons.

Figure 6:
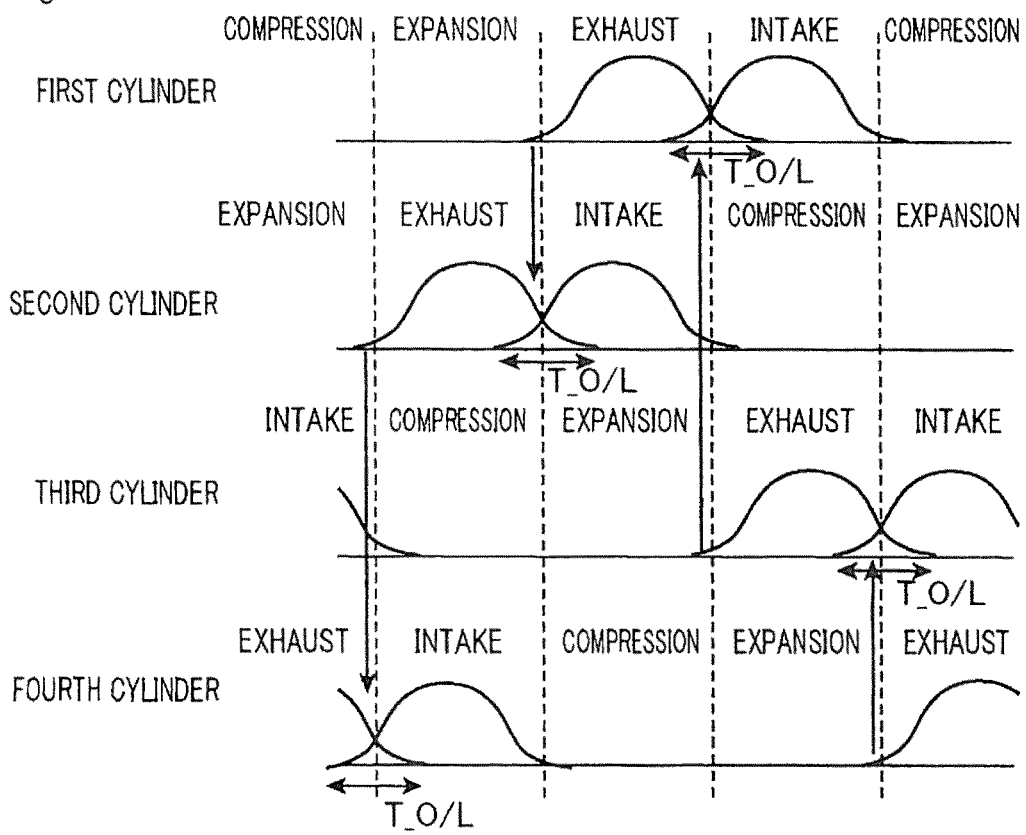
FIG. 6 is an explanatory chart illustrating valve timings of an intake valve and an exhaust valve.

The engine body 1 is a four-cycle engine. Specifically, as illustrated in FIG. 6, ignitions (firings) by the spark plugs 15 are performed in the first to fourth cylinders 12a to 12b at timings sequentially shifted by 180 CA (Crank Angle) degrees, so that an intake stroke, a compression stroke, an expansion stroke and an exhaust stroke are executed at timings sequentially shifted by 180 CA degrees. In this embodiment, firing is performed in the following order: the first cylinder 12a, the third cylinder 12c, the fourth cylinder 12d, the second cylinder 12b. Therefore, for example, exhaust stroke is also executed in the following order: the first cylinder 12a, the third cylinder 12c, the fourth cylinder 12d, the second cylinder 12b.

Each of the cylinders 12 has two intake ports 17 and two exhaust ports 18 each provided in an upper portion thereof and opened toward the combustion chamber. Each of the intake ports 17 is designed to introduce intake air into the cylinder 12. Each of the exhaust ports 18 is designed to discharge exhaust gas from the cylinder 12. Each of the cylinders 12 is provided with two intake valves 19 each adapted to open and close a respective one of the intake ports 17 so as to allow the intake port 17 to fluidically communicated with or isolated from an inside of the cylinder 12, and two exhaust valves 20 each adapted to open and close a respective one of the exhaust ports 18 so as to allow the exhaust port 18 to be fluidically communicated with or isolated from the inside of the cylinder 12. Each of the intake valves 19 is operable, according to driving by an intake-valve driving mechanism (a valve driver) 30, to open and close a respective one of the intake ports 17 at a predetermined timing. Further, each of the exhaust valves 20 is operable, according to driving by an exhaust-valve driving mechanism (a valve driver) 40, to open and close a respective one of the exhaust ports 18 at a predetermined timing.

The intake-valve driving mechanism 30 comprises an intake camshaft 31 for drivingly pushing the intake valve 19 in a periodic manner, and an intake VVT (Variable Valve Timing) device 32 for changing the valve timing of the intake valve 19.

The intake camshaft 31 is coupled to a crankshaft through a driving-force transmission mechanism such as a commonly-known chain and sprocket mechanism and adapted to be rotated along with rotation of the crankshaft so as to drivingly open and close the intake valve 19.

The intake VVT device 32 is adapted to change a phase difference between the intake camshaft 31, and a given driven shaft disposed in coaxial relation with the intake camshaft 31 and driven directly by the crankshaft and thereby change a phase difference between the intake camshaft 31 and the crankshaft, to change the valve timing of the intake valve 19. For example, a specific configuration of the intake VVT device 32 includes a hydraulically actuated mechanism designed to change the phase difference by adjusting a pressure difference between respective ones of a plurality of circumferentially-arranged liquid chambers provided between the driven shaft and the intake camshaft 31, and a magnetically actuated mechanism designed to change the phase difference by applying electric power to a solenoid provided between the driven shaft and the intake camshaft 31. The intake VVT device 32 is operable to variably set the phase difference in accordance with a target valve timing of the intake valve 19 calculated by the ECU 2.

The exhaust-valve driving mechanism 40 has a similar structure to that of the intake-valve driving mechanism 30. Specifically, the exhaust-valve driving mechanism 40 comprises an exhaust camshaft 41 coupled to the crankshaft to drivingly push the exhaust valve 20 in a periodic manner, and an exhaust VVT device 42 for changing a phase difference between the exhaust camshaft 41 and the crankshaft to change the valve timing of the exhaust valve 20. The exhaust VVT device 42 is operable to variably set the phase difference in accordance with a target valve timing of the exhaust valve 20 calculated by the ECU 2. Then, the exhaust camshaft 41 will be rotated while maintaining the set phase difference to drivingly open and close the exhaust valve 20 at the target valve timing.

In this embodiment, each of the intake VVT device 32 and the exhaust VVT device 42 is adapted to change a valve opening timing (valve opening start timing) and a valve closing timing (valve closing end timing) of a respective one of the intake valve 19 and the exhaust valve 20, while maintaining a valve opening period (a crank angle range during a period from start of a valve opening movement to end of a valve closing movement) of a respective one of the intake valve 19 and the exhaust valve 20.

The intake pipes 3 are connected to the respective intake ports 17 of the cylinders 12. Specifically, the intake pipe 3 is provided in a number of four, correspondingly to the member of cylinders, wherein each of the four intake pipes 3 is connected to the two intake ports 17 provided in a respective one of the cylinders 12.

The exhaust manifold 5 comprises three independent exhaust passages 52 independent from each other, and a collecting pipe 56 commonly provided downstream of the independent exhaust passages 52.

The independent exhaust passages 52 are connected to the respective exhaust ports 18 of the cylinders 12. Specifically, among the three independent exhaust passages 52, an independent exhaust passage 52a is connected to the two exhaust ports 18 of the first cylinder 12a, and an independent exhaust passage 52d is connected to the two exhaust ports 18 of the fourth cylinder 12d. On the other hand, in the second and third cylinders 12b, 12c whose exhaust strokes are not adjacent to each other (i.e., whose exhaust strokes are not successive with respect to each other), exhaust gas is not simultaneously discharged from these cylinders 12b, 12c. Thus, in view of structural simplification, one independent exhaust passage 52b is connected to the four exhaust ports 18 of the second and third cylinders 12b, 12c. More specifically, the independent exhaust passage 52b connected to the exhaust ports 18 of the second and third cylinders 12b, 12c is divided into two passages on an upstream side thereof, wherein the two exhaust ports 10 of the second cylinder 12b are connected to one of the divided passages, and the two exhaust ports 10 of the third cylinder 12c are connected to the other divided passage.

The independent exhaust passages 52 (52a, 52b, 52d) are connected to the cylinders 12 (12a to 12d) in the above manner, so that exhaust gas discharged from the second cylinder 12b or the third cylinder 12c, exhaust gas discharged from the first cylinder 12a, and exhaust gas discharged from the fourth cylinder 12d, are discharged in an downstream direction through the independent exhaust passages 52, mutually independently (without interfering with each other).

The independent exhaust passage 52b corresponding to the second cylinder 12b and the third cylinder 12c has a linear portion linearly extending at a position intermediate between the cylinders 12b, 12c, i.e., a position opposed to an approximately central region of the engine body 1, and a bifurcated portion extending bifurcatedly from an upstream end of the linear portion toward the exhaust ports 18 of the cylinders 12b, 12c. On the other hand, each of the independent exhaust passages 52a, 52d corresponding to respective ones of the first and second cylinders 12a, 12d extends curvedly toward a downstream end portion of the independent exhaust passage 52b corresponding to the second cylinder 12b and the third cylinder 12c.

The collecting pipe 56 is connected to a downstream side of the independent exhaust passages 52, so that exhaust gas passing through the independent exhaust passages 52 is collected by the collecting pipe 56.

As illustrated in FIGS. 2 and 3, the collecting pipe 56 comprises a gas inlet portion 56a, a narrowed portion 56b, a straight portion 56c, a diffuser portion 56d, and a connection end portion 56e, which are located in this order from an upstream end thereof. The three independent exhaust passages 52 are connected to the gas inlet portion 56a at a position where respective downstream ends of the independent exhaust passages 52 are located adjacent to each other.

The independent exhaust passages 52 and the collecting pipe 56 are designed such that, as exhaust gas passing through one of the independent exhaust passages 52 is ejected into the collecting pipe 56 at high speed, exhaust gas in an adjacent one of the remaining independent exhaust passages 52 and the exhaust ports 18 fluidically communicated therewith is sucked in the downstream direction by the action of a negative pressure generated around the ejected gas flow, i.e., by an ejector effect.

Specific configurations of the independent exhaust passages 52 and the collecting pipe 56 will be described below.

Figure 4:
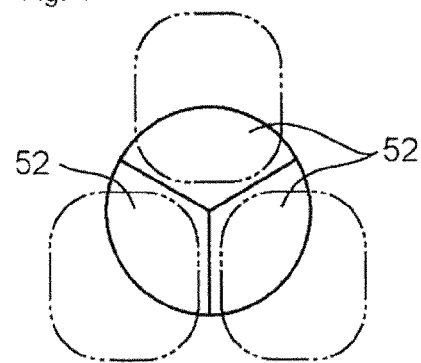
FIG. 4 is a sectional view taken along the line IV-IV in FIG. 2.

A downstream portion of each of the independent exhaust passages 52 has a shape with a cross-sectional area (an area of a section cut along a direction perpendicular to a direction of exhaust gas flow) which gradually decreases toward the downstream direction, in order to allow exhaust gas to be ejected from the independent exhaust passage 52 into the collecting pipe 56 at high speed. In this embodiment, as illustrated in FIG. 4, the most part of each of the independent exhaust passages 52 including an upstream portion thereof has a generally oval cross-section (the two-dot chain line in FIG. 4). Further, the downstream portion of each of the independent exhaust passages 52 is formed such that a cross-sectional area thereof gradually decreases toward the downstream direction, and the downstream end of the downstream portion has a cross-sectionally sector shape with an area about ⅓ an oval cross-sectional area of the upstream portion. The three independent exhaust passages 52 are merged together in such a manner that the downstream ends each having a sector shape form a generally circular cross-section as a whole, and connected to the collecting pipe 56.

Figure 5:
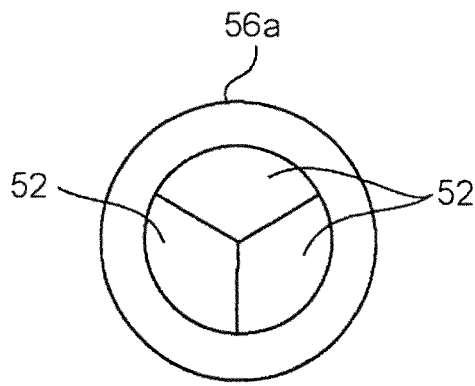
FIG. 5 is a sectional view taken along the line V-V in FIG. 3.

In this connection, if an inner peripheral surface of the gas inlet portion 56a located at the upstream end of the collecting pipe 56 is formed in substantially the same cross-sectional shape as that (circular shape indicated by the solid line in FIG. 4) of an assembly of the downstream ends of the independent exhaust passages 52, exhaust gas flowing into the gas inlet portion 56a is liable to adhere onto an inner wall of the gas inlet portion 56a, which causes lowering in speed of exhaust gas. Therefore, in the engine system 100, in order to prevent exhaust gas ejected from the independent exhaust passages 52 from adhering onto the inner wall of the gas inlet portion 56a to cause lowering in speed of exhaust gas, the inner peripheral surface of the gas inlet portion 56a of the collecting pipe 56 is formed to have a radial dimension (a dimension in a direction perpendicular to the exhaust gas flow direction) greater than that of a cross-sectional shape of the assembly of the downstream ends of the independent exhaust passages 52. Specifically, in this embodiment, the gas inlet portion 56a is formed in a circular cylindrical shape having a relatively large diameter. More specifically, as illustrated in FIGS. 2 and 5, the inner peripheral surface of the gas inlet portion 56a is formed in a circular shape having a relatively large inner diameter, in such a manner that it is located radially outwardly with respect to a cross-sectionally circular inner peripheral surface of the assembly of the downstream ends of the independent exhaust passages 52. For example, when an inner diameter of a circular cylinder made up of the assembly of the downstream ends of the independent exhaust passages 52 is 40 mm, an inner diameter of the gas inlet portion 56a may be set to 60 mm The narrowed portion 56b of the collecting pipe 56 has a shape with a cross-sectional area which gradually decreases toward the downstream direction, in order to allow exhaust gas to flow from the gas inlet portion 56a in the downstream direction while maintaining a high speed. In this embodiment, the narrowed portion 56b has a circular truncated cone shape with an inner diameter which gradually decreases toward the downstream direction.

The straight portion 56c provided downstream of the narrowed portion 56b is a circular cylindrical-shaped member continuous with a downstream end of the narrowed portion 56b. The straight portion 56c extends in the downstream direction while keeping a cross-sectional area thereof constant.

As above, each of the downstream portion of the independent exhaust passage 52, and an upstream portion (in this embodiment, the gas inlet portion 56a and the narrowed portion 56b) of the collecting pipe 56, has a shape with a cross-sectional area which gradually decreases toward the downstream direction. Thus, exhaust gas discharged from the independent exhaust passage 52 is ejected into the straight portion 56c at high speed, and a strong negative pressure is generated around the ejected gas flow.

In this connection, assuming that a (see FIG. 3) is a diameter of a perfect circle having the same area as the cross-sectional area of the downstream end of the independent exhaust passage 52, and D (see FIG. 3) is a diameter of a perfect circle having the same area as the cross-sectional area of the downstream end of the narrowed portion 56*b* (which is equal to the cross-sectional area of the straight portion 56*c*), it has been verified that, when a/D is set to 0.5 or more, exhaust gas flows into the straight portion 56*c* at a sufficiently high speed to provide a high ejector effect. Therefore, in this embodiment, the cross-sections of the independent exhaust passage 52 and others are formed in respective shapes satisfying the following relation: a/D>=0.5 (a/D is not smaller than 0.5).

Further, the diffuser portion 56*d* of the collecting pipe 56 has a shape with a cross-sectional area which gradually increases toward the downstream direction, in order to allow an exhaust gas flow speed to be increased in a passage between the downstream end of the independent exhaust passage 52 and the straight portion 56*c*, so as to restore a lowered exhaust gas pressure based on the increase in exhaust gas flow speed. In this embodiment, the diffuser portion 56*d* has a circular truncated cone shape with an inner diameter which gradually increases toward the downstream direction.

The connection end portion 56*e* provided downstream of the diffuser portion 56*d* is a portion connected to the catalytic device 6. The connection end portion 56*e* is formed in a circular cylindrical shape having a constant cross-sectional area. A downstream end of the connection end portion 56*e* is connected to an aftermentioned casing 62 of the catalytic device 6, so that exhaust gas passing through the connection end portion 56*e* flows into the aftermentioned casing 62.

Figure 7:
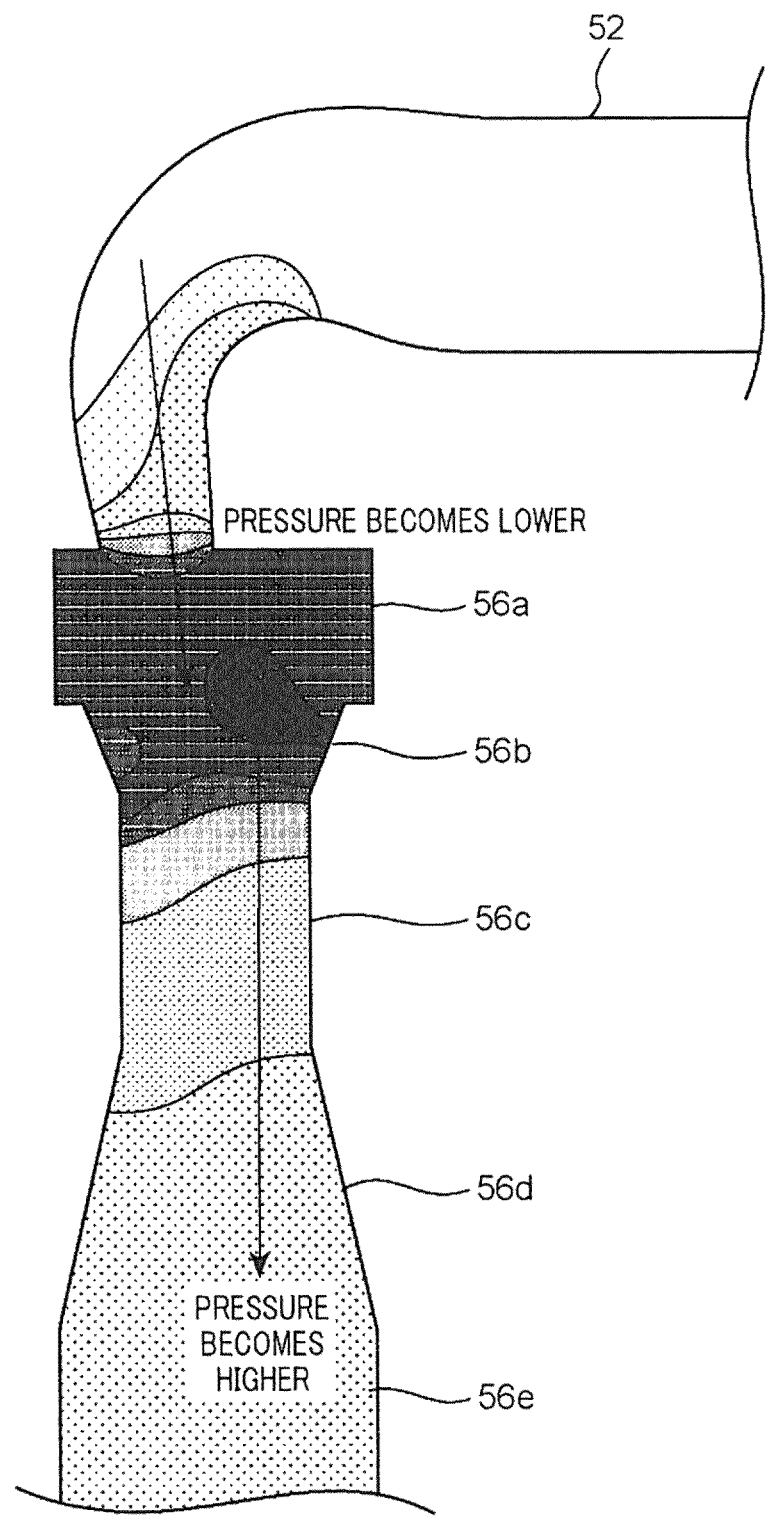
FIG. 7 is a schematic diagram illustrating a pressure distribution in an independent exhaust passage and a collecting pipe.

FIG. 7 illustrates a result obtained by checking a pressure distribution in the independent exhaust passage 52 and the collecting pipe 56, which occurs when exhaust gas is discharged from a certain one of the cylinders 12 connected to the independent exhaust passage 52. The pressure distribution illustrated in FIG. 7 was measured at a timing just after start of opening of the exhaust valve 20 in the certain cylinder 12 and when high-pressure and high-speed exhaust gas (so-called "blowdown gas") is discharged from the certain cylinder 12 into the collecting pipe 56 through the independent exhaust passages 52. As illustrated in FIG. 7, an exhaust gas pressure is gradually lowered in a passage between the downstream portion of the independent exhaust passage 52 and a vicinity of an upstream end of the straight portion 56*c*, and, in the upstream portion (the gas inlet portion 56*a* and the narrowed portion 56*b*) of the collecting pipe 56, the exhaust gas pressure is sufficiently lowered with respect to that in the upstream portion of the independent exhaust passage 52. This produces the ejector effect of allowing exhaust gas of an adjacent one of the remaining independent exhaust passages 52 to be sucked in the downstream direction. Then, the exhaust gas pressure is gradually increased in a passage downstream with respect to the narrowed portion 56*b* of the collecting pipe 56, and, after the exhaust gas passes through the straight portion 56*c* and the diffuser portion 56*b*, the exhaust gas pressure is restored to a sufficiently-high value.

The catalytic device 6 is designed to purify exhaust gas discharged from the engine body 1. As illustrated in FIG. 3, the catalytic device 6 comprises a catalyst body 64 composed of a three-way catalyst or the like, and a casing 62 housing the catalyst body 64.

The casing 62 has an introduction portion 62*a* connected to the connection end portion 56*e* of the collecting pipe 56, a catalyst receiving portion 62*c* located downstream of the introduction portion 62*a* and receiving therein the catalyst body 64, and a volume-enlarged portion 62*b* interposed between the introduction portion 62*a* and the catalyst receiving portion 62*c*.

The introduction portion 62*a* is formed in a circular cylindrical shape having a diameter approximately equal to that of the connection end portion 56*e*. The catalyst body 64 is a circular cylindrical member having a diameter greater than that of the collecting pipe 56 in order to ensure a sufficient catalytic capacity. Accordingly, the catalyst receiving portion 62*c* is formed in a circular cylindrical shape having a diameter greater than that of the introduction portion 62*a*. For example, when the diameter of the introduction portion 62*a* is about 60 mm, the diameter of the catalyst receiving portion 62*c* may be set to about 100 mm. The volume-enlarged portion 62*b* provided between the introduction portion 62*a* and the catalyst receiving portion 62*c* has a circular truncated cone shape with an inner diameter which gradually increases from the introduction portion 62*a* to the catalyst receiving portion 62*c*, in order to allow exhaust gas to smoothly flow from the introduction portion 62*a* into the catalyst receiving portion 62*c* therethroughout.

As above, a space having a relatively large volume, i.e., an enlarged cross-sectional area as compared to a passage upstream of the volume-enlarged portion 62*b* (in this embodiment, the introduction portion 62*a* of the casing 62), is formed in the volume-enlarged portion 62*b*. Therefore, a pressure wave of exhaust gas flowing from the connection end portion 56*e* of the collecting pipe 56 into the volume-enlarged portion 62*b* through the introduction portion 62*a* of the casing 62 is reversed and reflected by the volume-enlarged portion 62*b*.

Specifically, just after the exhaust valve 20 in a certain one of the cylinders 12 is opened, exhaust gas is rapidly discharged, so that a high positive pressure is generated in the exhaust port 18, and a positive pressure wave based on the positive pressure will be propagated toward the downstream direction at sonic speed. Thus, a pressure wave initially reaching the volume-enlarged portion 62*b* just after opening of the exhaust valve 20 is a positive pressure wave. Then, the positive pressure wave is reversed to a negative pressure wave and reflected, and the reversed negative pressure wave will be propagated toward an upstream direction at sonic speed.

Meanwhile, the exhaust gas itself discharged from the exhaust port 18 continuously flows in the downstream direction to pass through the independent exhaust passage 52, the collecting pipe 56, the introduction portion 62*a* and the volume-enlarged portion 62*b*, in this order. As mentioned above, high-pressure and high-speed exhaust gas discharged from the exhaust port 18 is gradually increased in flow speed (accordingly, the exhaust gas pressure is gradually lowered) during the course of passing through the downstream portion of the independent exhaust passage 52 and the upstream portion (the gas inlet portion 56*a* and the narrowed portion 56*b*) of the collecting pipe 56 each having a cross-sectional area which gradually decreases toward the downstream direction. Then, the exhaust gas pressure is restored by causing the exhaust gas to pass through the diffuser portion 56*d* of the collecting pipe 56. The exhaust gas pressure is further restored by causing the exhaust gas to pass through the connection end portion 56*e* of the collecting pipe 56 and the introduction portion 62*a* of the casing 62, and then the exhaust gas flows into the volume-enlarged portion 62*b*.

Figure 8:
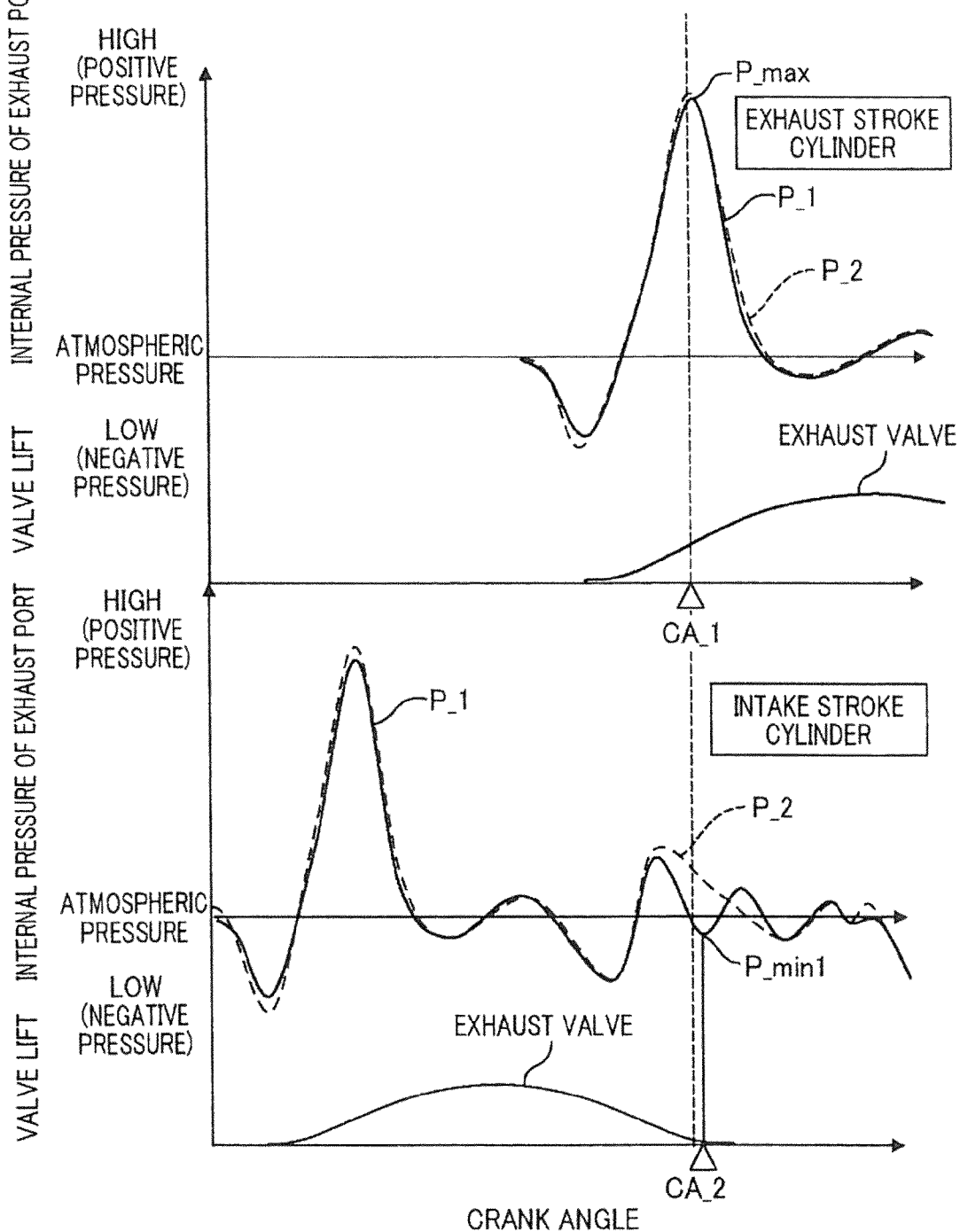
FIG. 8 is a chart illustrating a pressure change in an exhaust port.
Figure 9:
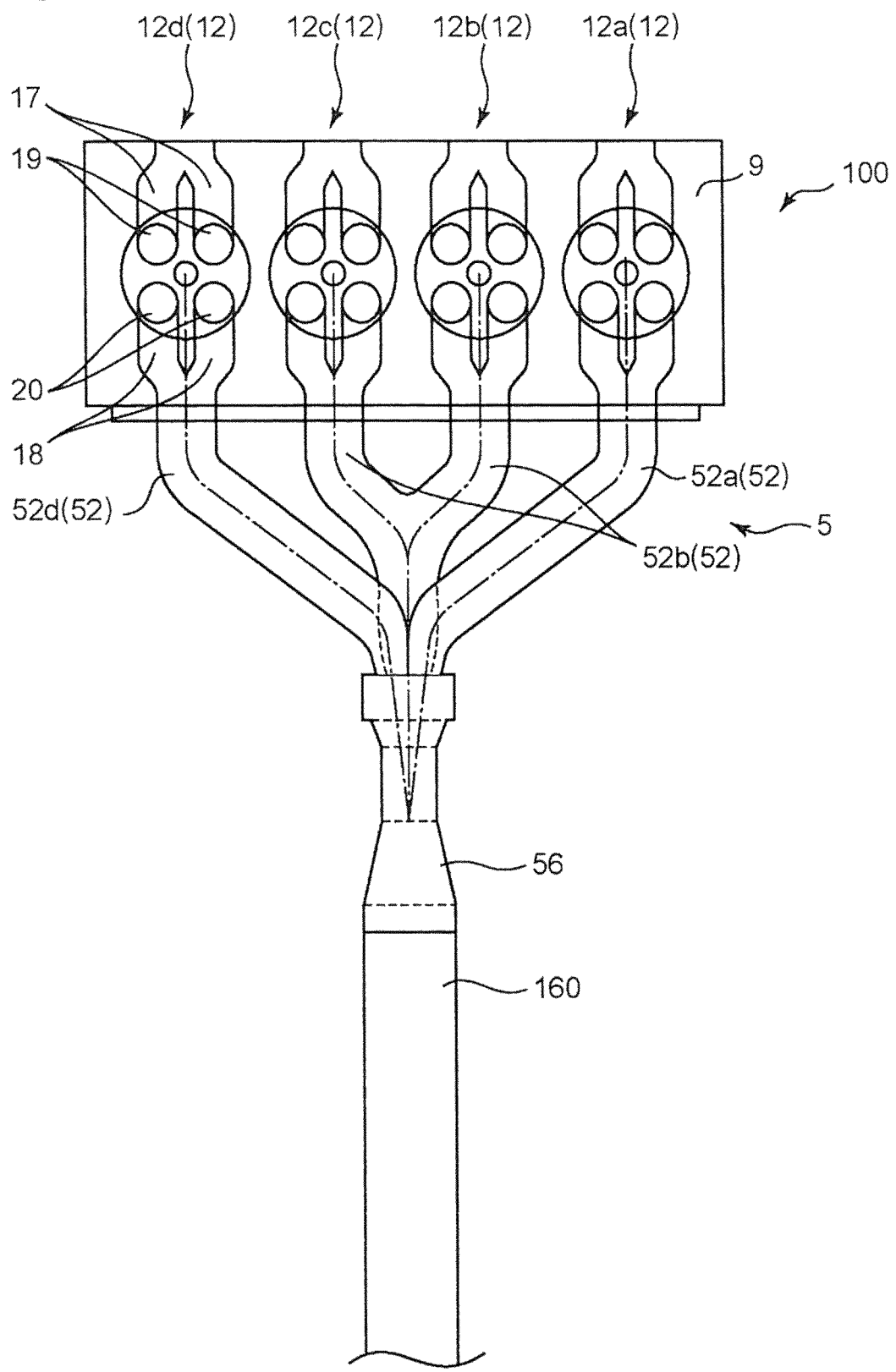
FIG. 9 is a schematic diagram illustrating an engine system for comparison with the multi-cylinder engine system according to the embodiment of the present invention.

FIG. 8 illustrates a result obtained by measuring an internal pressure of the exhaust port 18 in a certain one of the cylinders 12 in order to detect generation of a negative pressure wave by reversion and reflection in the volume-enlarged portion 62*b*, and arrival of the negative pressure wave at the exhaust port 18, together with a lift curve, i.e., valve lift, of the exhaust valve 20. The pressure waveform P_1 indicated by the solid line in FIG. 8 is a measurement result based on the engine system 100. On the other hand, the pressure waveform P_2 indicated by the broken line in FIG. 8 is a result obtained by checking the internal pressure of the exhaust port 18 in a system where a portion having an enlarged volume (equivalent to the volume-enlarged portion 62a in this embodiment) is not provided downstream with respect to the collecting pipe 56, i.e., a passage located downstream with respect to the collecting pipe 56 is composed of a circular cylindrical pipe 160 having a diameter equal to that of the connection end portion 56e of the collecting pipe 56, as illustrated in FIG. 9 (the engine system illustrated in FIG. 9 will hereinafter be referred to as "comparative system"). Further, the uppermost graph and the second lowest graph in FIG. 8 illustrate changes in internal pressure of the exhaust port 18, in two cylinders whose exhaust strokes are successive with respect to each other, respectively. In the following description, assuming that a present time is a timing just after a crank angle =CA_1, a cylinder in which the exhaust valve 20 is opened will be referred to as "exhaust stroke cylinder", and a cylinder whose exhaust stroke immediately precedes that of the exhaust stroke cylinder will be referred to as "intake stroke cylinder". In FIG. 8, in order to eliminate an influence of a negative pressure to be generated in the exhaust port 18 by the ejector effect, so as to detect only a negative pressure wave generated by reversion and reflection in the volume-enlarged portion 62b, the internal pressure was measured without overlapping between a valve opening period of the exhaust valve 20 and a valve opening period of the intake valve 19.

In FIG. 8, just after start of opening of the exhaust valve 20 of the exhaust stroke cylinder 12 (when crank angle =CA_1), blowdown gas having an extremely high pressure (=P_max) and a high speed is discharged from the exhaust stroke cylinder 12. In the engine system 100, just after the above timing (around the crank angle CA_2), the internal pressure of the exhaust port 18 in the intake stroke cylinder 12 becomes a negative pressure (=P_min1). In contrast, in the comparative system, just after discharge of the blowdown gas, the internal pressure of the exhaust port 18 in the intake stroke cylinder 12 is maintained at a positive pressure. Based on the above results, it was verified that a negative pressure is generated in the exhaust ports 18 in consequence of the presence of the volume-enlarged portion 62b.

In the engine system 100, a length L1 of a passage between the independent exhaust passage 52 and the volume-enlarged portion 62b, i.e., a length L1 (see FIG. 2) between the upstream end of the collecting pipe 56 (upstream end of the gas inlet portion 56a) and an upstream end of the volume-enlarged portion 62b, is set to a dimension satisfying the following condition. The length L1 is set to a dimension which allows a negative pressure wave generated at an engine speed equal to or less than a preset reference engine speed N1 through a phenomenon that a positive pressure wave of exhaust gas discharged from a certain one of the cylinders (exhaust stroke cylinder 12) is reflected by the volume-enlarged portion 62b, to reach the exhaust port 18 in one of the remaining cylinders (intake stroke cylinder 12) whose exhaust stroke immediately precedes that of the exhaust stroke cylinder 12, during an overlap period in the intake stroke cylinder 12. In this embodiment, the reference engine speed N1 is set to 4000 rpm, and the length L1 between the upstream end of the collecting pipe 56 and the upstream end of the volume-enlarged portion 62b is set to 300 mm.

With a view to reducing a time period after the negative pressure wave is generated in the volume-enlarged portion 62b through until it reaches the exhaust port 18 of the intake stroke cylinder 12, the length L1 between the upstream end of the collecting pipe 56 and the upstream end of the volume-enlarged portion 62b may be reduced. However, if the length L1 is excessively reduced, the volume-enlarged portion 62b having a relatively large volume will be disposed on a more upstream side, which increases restrictions on layout. From this point of view, in this embodiment, the length L1 between the upstream end of the collecting pipe 56 and the upstream end of the volume-enlarged portion 62b is set to 300 mm.

A target value of a valve timing (target valve timing) of each of the intake valve 19 and the exhaust valve 20 is preliminarily set depending on engine operating conditions, and stored in the ECU 2. The ECU 2 is operable to calculate a current engine operating condition based on signals from various sensors to extract target valve timings corresponding to the calculated engine operating condition, and drive the intake VVT device 32 and the exhaust VVT device 42 to allow actual valve timings of the intake valve 19 and the exhaust valve 20 to coincide with respective ones of the target valve timings.

The target valve timings of the intake valve 19 and the exhaust valve 20 will be described below.

The target valve timings of the intake valve 19 and the exhaust valve 20 are set such that, in the entire engine operating region, the valve opening period of the exhaust valve 20 and the valve opening period of the intake valve 19 overlap with each other across top dead center of an intake stroke (intake TDC), and the exhaust valve 20 of a certain one of the cylinders (exhaust stroke cylinder 12) starts opening during an overlap period in one of the remaining cylinders (intake stroke cylinder 12) whose exhaust stroke immediately precedes that of the exhaust stroke cylinder 12. Specifically, as illustrated in FIG. 6, the exhaust valve 20 of the third cylinder 12c starts opening during an overlap period T_O/L where both of the intake valve 19 and the exhaust valve 20 in the first cylinder 12a are opened, and the exhaust valve 20 of the fourth cylinder 12d starts opening during an overlap period T_O/L where both of the intake valve 19 and the exhaust valve 20 in the third cylinder 12c are opened. Further, the exhaust valve 20 of the second cylinder 12b starts opening during an overlap period T_O/L where both of the intake valve 19 and the exhaust valve 20 in the fourth cylinder 12d are opened, and the exhaust valve 20 of the first cylinder 12a starts opening during an overlap period T_O/L where both of the intake valve 19 and the exhaust valve 20 in the second cylinder 12b are opened.

The target valve timings of the intake valve 19 and the exhaust valve 20 are also set to allow the negative pressure wave generated through the phenomenon that a pressure wave of exhaust gas discharged from the exhaust stroke cylinder 12 (a certain one of the plurality of cylinders, whose exhaust valve 20 is opened) is reversed and reflected by the volume-enlarged portion 62b at a certain engine speed equal to or less than the preset reference engine speed N1, to reach the exhaust port 18 in the intake stroke cylinder 12 (one of the remaining cylinders, whose exhaust stroke immediately precedes that of the exhaust stroke cylinder 12) during the overlap period T_O/L in the intake stroke cylinder 12. For example, in this embodiment where the length L1 between the upstream end of the collecting pipe 56 and the upstream end of the volume-enlarged portion 62b is set to 300 mm, at an engine speed of 4000 rpm, the valve opening timing and the valve closing timing of the exhaust valve 20 are set to BBDC (Before Bottom Dead Center) 65 CA degrees and ATDC (After Top Dead Center) 15 CA degrees, respectively, and the valve opening timing of the intake valve 19 is set to BTDC (Before Top Dead Center) 10 CA degrees.

In the engine system 100, as illustrated in FIG. 10, the valve opening timing and the valve closing timing in each of the intake valve 19 and the exhaust valve 20 mean an opening start timing and a closing end timing, respectively, on an assumption that an interval, except for a zones around valve opening and closing points where the valve lift curve has a gentle slope (ramp zones), is defined as a valve opening period. For example, when a height in the ramp zone is 0.4 mm, a timing when a valve lift amount is increased or reduced to 0.4 mm is defined as the valve opening timing and the valve closing timing, respectively.

Intake performance of the engine system 100 configured in the above manner will be described below.

As mentioned above, in the engine system 100, each of the downstream portion of a respective one of the independent exhaust passages 52 and the upstream portion of the collecting pipe 56 is formed such that a cross-sectional area (an area of a section cut along a direction perpendicular to the exhaust gas flow direction) thereof gradually decreases toward the downstream direction. In addition, the target valve timings of the intake valve 19 and the exhaust valve 20 in each of the cylinders 12 are set such that the exhaust valve 20 in a certain one of the cylinders (exhaust stroke cylinder 12) starts opening during the overlap period T_O/L in one of the remaining cylinders (intake stroke cylinder 12) whose exhaust stroke immediately precedes that of the exhaust stroke cylinder 12.

Thus, just after opening of the exhaust valve in the exhaust stroke cylinder 12, extremely high-pressure and high-speed exhaust gas (blowdown gas) is discharged, and ejected into the collecting pipe 56 through the independent exhaust passage 52. Along with the ejection, a strong negative pressure generated around the ejected gas flow is applied to the exhaust port 18 of the intake stroke cylinder 12 during the overlap period T_O/L in the intake stroke cylinder 12 (ejector effect), so that it becomes possible to promote scavenging in the intake stroke cylinder 12 during the overlap period T_O/L.

The downstream ends of the independent exhaust passages 52 are disposed in adjacent relation and connected to the gas inlet portion 56a. Thus, a sucking force produced through the independent exhaust passage 52 connected to the exhaust stroke cylinder 12 is effectively applied to the independent exhaust passage 52 connected to the intake stroke cylinder 12.

As mentioned above, the engine system 100 is configured such that, at a certain engine speed equal to or less than the preset reference engine speed N1, a negative pressure wave is generated through a phenomenon that a positive pressure wave of exhaust gas discharged from the exhaust stroke cylinder 12 is reversed and reflected by the volume-enlarged portion 62b of the catalytic device 6, and the generated negative pressure wave reaches the exhaust port 18 in the intake stroke cylinder 12 during the overlap period in the intake stroke cylinder 12. Thus, in association with arrival of the negative pressure wave, it becomes possible to further promote the scavenging in the intake stroke cylinder 12 during the overlap period T_O/L.

FIG. 11 illustrates a result obtained by checking an internal pressure waveform P_3 (one-dot chain line) of the exhaust port 18 in case of taking into account of an influence of overlapping between the valve opening period of the exhaust valve 20 and the valve opening period of the intake valve 19, in addition to an influence of the negative pressure wave (see the pressure waveform P_1 indicated by the solid line in FIG. 8) generated by reversion and reflection in the volume-enlarged portion 62b. As illustrated in FIG. 11, when the valve opening period of the exhaust valve 20 and the valve opening period of the intake valve 19 overlap with each other, the ejector effect is produced in addition to the influence of the negative pressure wave generated by reversion and reflection in the volume-enlarged portion 62b, so that the internal pressure of the exhaust port 10 becomes a strong negative pressure (P_min2) at the crank angle CA_2 after the exhaust valve 20 in the exhaust stroke cylinder 12 is opened, which provides high scavenging performance. The results in FIGS. 8 and 11 was obtained at an engine speed of 1500 rpm in the engine system 100 where the length L1 between the upstream end of the collecting pipe 56 and the upstream end of the volume-enlarged portion 62b is set to 300 mm.

As above, the engine system 100 can promote scavenging of the cylinders 12 by effectively utilizing reversion and reflection of an exhaust gas pressure wave in addition to the ejector effect, to enhance intake efficiency and therefore increase engine power output.

In the present invention, specific values of the length L1 between the upstream end of the collecting pipe 56 (upstream end of the gas inlet portion 56a) and the upstream end of the volume-enlarged portion 62b, and the reference engine speed N1, are not limited to the values in the above embodiment (L1=300 mm, N1=4000 rpm). For example, the length L1 may be set to a value less than 300 mm. When the length L1 is reduced, it becomes possible to reduce a time period after a positive pressure wave based on blowdown gas is emitted from the exhaust port 18 of the exhaust stroke cylinder 12 through until a negative pressure wave generated by reversion and reflection in the volume-enlarged portion 62b reaches the exhaust port 18 of the intake stroke cylinder 12. Thus, an engine speed at which a timing of arrival of the negative pressure wave can fall within the overlap period T_O/L in the intake stroke cylinder 12 (i.e., an engine speed at which scavenging based on the negative pressure wave can be promoted) is set to a higher value. However, in the passage between the exhaust port 18 and the volume-enlarged portion 62b, the pressure wave will repeatedly move back and forth while changing from a positive pressure to a negative pressure and from a negative pressure to a positive pressure, alternately (exhaust pulse). Thus, as long as the negative pressure wave is a higher-order wave (plurality of times of the back-and-force movements), it is possible to allow the negative pressure wave to reach the exhaust port 18 of the intake stroke cylinder 12 during the overlap period T_O/L in the intake stroke cylinder 12, even if the engine speed is low. Therefore, in cases where the length L1 between the upstream end of the collecting pipe 56 and the upstream end of the volume-enlarged portion 62b is reduced, it becomes possible to promote scavenging by utilizing the negative pressure wave based on exhaust pulse, in a wider engine speed region.

However, the negative pressure wave based on exhaust pulse more largely attenuates as the order of wave becomes higher. Thus, when the length L1 between the upstream end of the collecting pipe 56 and the upstream end of the volume-enlarged portion 62b is reduced, the scavenging promoting effect at a low engine speed region is relatively deteriorated as compared to cases where the length L1 is set to a large value. Therefore, in cases where it is necessary to promote scavenging, particularly, at a low engine speed region, it is preferable to increase the length L1.

On the other hand, if the length L1 is excessively increased, a temperature of exhaust gas flowing into the catalyst body 64 disposed downstream of the volume-enlarged portion 62b becomes lower. Further, even if it is configured to allow the negative pressure wave to reach the exhaust port 18 of the intake stroke cylinder 12 at an extremely-low engine speed region where the engine speed is extremely low, the resulting scavenging promoting effect is rarely useful. Therefore, the length L1 between the upstream end of the collecting pipe 56 and the upstream end of the volume-enlarged portion 62*b* is preferably set to 1.0 m or less.

For example, when the length L1 is set to 1.0 m, at an engine speed of about 2000 rpm, the valve opening timing and the valve closing timing of the exhaust valve 20 may be set to BBDC 65 CA degrees and ATDC 15 CA degrees, respectively, and the valve opening timing of the intake valve 10 may be set to BTDC 30 CA degrees. In this case, it is possible to allow a negative pressure wave generated by reversion and reflection in the volume-enlarged portion 62*b* to reach the exhaust port 18 of the intake stroke cylinder 12 while generating a negative pressure in the exhaust port 18 of the intake stroke cylinder 12 by the ejector effect, during the overlap period T_O/L in the intake stroke cylinder 12. However, if the length L1 is increased to a value greater than 1.0 m, it is possible to allow the negative pressure wave to reach the exhaust port 18 of the intake stroke cylinder 12 only at an extremely-low engine speed region where the engine speed is less than 2000 rpm. Moreover, in order to sufficiently ensure the overlap period T_O/L, the closing timing of the exhaust valve 20 has to be further delayed, which is likely to cause blow back of exhaust gas. Thus, it is preferable to set the length L1 to 1.0 m or less.

The gas inlet portion 56*a* in the collecting pipe 56 is not limited to a specific configuration in the above embodiment, but may be configured to, when exhaust gas is ejected from one of the independent exhaust passages 52 into the gas inlet portion 56*a* at high speed, generate a negative pressure in a certain one of the remaining independent exhaust passages 52 so as to allow exhaust gas in the exhaust port 18 connected to the certain independent exhaust passage 52 to be sucked in the downstream direction.

For example, the gas inlet portion 56*a* may be configured such that an inner diameter thereof coincides with that of the circular cross-section of the assembly of the downstream ends of the independent exhaust passages 52. However, in cases where the gas inlet portion 56*a* has an inner peripheral surface formed to have a radial dimension greater than that of a cross-sectional shape of the assembly of the downstream ends of the independent exhaust passages 52 as in the above embodiment, it becomes possible to suppress exhaust gas ejected from each of the independent exhaust passages 52 from adhering onto or colliding with the inner wall of the gas inlet portion 56*a* to cause lowering in flow speed of exhaust gas.

The diffuser portion 56*d* may be omitted. However, in cases where the diffuser portion 56*d* is provided in the collecting pipe 56 as in the above embodiment, the exhaust gas pressure lowered by passing through the narrowed portion 56*b* of the collecting pipe 56, etc., can be restored within a short passage. In addition, the diffuser portion 56*a* allows exhaust gas to evenly flow into the catalyst body 64 disposed downstream thereof, so that it becomes possible to sufficiently bring out exhaust gas purification performance of the catalyst body 64.

In the above embodiment, the exhaust gas pressure wave is reversed and reflected by the volume-enlarged portion 62*b* of the casing 62 of the catalytic device 6. Alternatively, in place of the volume-enlarged portion 62*b*, a volume-enlarged portion prepared separately from the casing 62 to have a cross-sectional area greater than that of the collecting pipe 56 may be provided downstream of the collecting pipe 56. However, when he volume-enlarged portion is formed using the casing 62 of the catalytic device 6, it becomes possible to facilitate structural simplification, and reduce a distance between the engine body 1 and the catalyst body 64 to more quickly activate the catalyst body 64, as compared with cases where the volume-enlarged portion is provided separately from the casing 62.

A shape of the volume-enlarged portion 62*b* is not limited to a circular truncated cone shape as in the above embodiment, but may be any other suitable shape, such as a circular cylindrical shape, as long as it has a cross-sectional area greater than that of the collecting pipe 56.

The above embodiment has been described based on an example where, in the entire engine operating region, an control is performed which causes the valve opening period of the intake valve 19 and the valve opening period of the exhaust valve 20 to overlap with each other, and causes the exhaust valve 20 in a certain one of the cylinders (exhaust stroke cylinder 12) to start opening during the overlap period in one of the remaining cylinders (intake stroke cylinder 12) whose exhaust stroke immediately precedes that of the exhaust stroke cylinder 12. Alternatively, the above control may be performed only in a part of the engine operating region including a low engine speed region where the engine speed is equal to or less than the reference engine speed N1. Specifically, in an engine operating region where the engine speed is high, an exhaust gas flow volume is increased, and thereby a demerit due to an increase in pumping loss is likely to become larger than a scavenging promoting effect to be obtained by the ejector effect. Thus, in such a case, it is preferable to controllably set the intake valve 19 and the exhaust valve 20 to timings capable of reducing the pumping loss, and it is not essential to provide an overlap period therebetween.

Further, in order to reduce the aforementioned pumping loss in an engine operating region where the engine speed is high, a bypass passage for bypassing the collecting pipe 56 may be provided. Specifically, a passage extending from a halfway position of each of the independent exhaust passages 52 to bypass the collecting pipe 56 and fluidically communicated with a passage upstream with respect to the volume-enlarged portion 62*b* is provided as the bypass passage. Preferably, the bypass passage is formed to have a constant cross-sectional area so as not to increase flow resistance of exhaust gas. Further, a switching valve for selectively opening and closing the bypass passage is installed inside the bypass passage. In this case, the switching valve may be adapted, in a low engine speed region where the engine speed is equal to or less than the reference engine speed N1, to be closed, and, in an engine operating region where the engine speed is greater than the reference engine speed N1, to be opened. Thus, in an engine operating region where the engine speed is relatively high, exhaust gas discharged from each of the cylinders passes through not only the independent exhaust passage 52 and the collecting pipe 56 but also the bypass passage, so that it becomes possible to effectively reduce the pumping loss.

In the above embodiment, one bifurcated independent exhaust passage 52*b* is connected to the exhaust ports 18 of the second and third cylinders 12*b*, 12*c* whose exhaust strokes are not successive with respect to each other. Alternatively, two independent exhaust passages may be connected to the second cylinder 12*b* and the third cylinders 12*c*, respectively. In other words, in this case, four independent exhaust passages are connected to the four first to fourth cylinders 12*a* to 12*d* in a one-to-one correspondence. It is understood that a positional relationship between respective ones of the four independent exhaust passages in this case needs to be set to allow two of the independent exhaust passages connected to respective ones of two of the cylinders, whose exhaust strokes are successive with respect to each other, are connected to the collecting pipe 56 at mutually adjacent positions. For example, it is contemplatable that a cross-sectional shape of a downstream end of each of the four independent exhaust passages is formed in a sector shape obtained by dividing a circle equally into four pieces, and an assembly of the downstream ends formed in a generally circular shape as a whole is connected to collecting pipe 56.

SUMMARY OF EMBODIMENT

Lastly, features and advantageous effects based on the contents of the above embodiment will be collectively described.

An intake and exhaust system in the above embodiment is provide in a multi-cylinder engine having a plurality of cylinders (12) each provided with an intake port (17), an exhaust port (18), an intake valve (19) capable of opening and closing the intake port, and an exhaust valve (20) capable of opening and closing the exhaust port. The intake and exhaust system comprises: a plurality of independent exhaust passages (52) each connected to the exhaust port (18) in a respective one of the plurality of cylinders, or the exhaust ports (18) in two or more of the plurality of cylinders, whose exhaust strokes are not successive with respect to each other; a collecting pipe (56) connected to downstream ends of the plurality of independent exhaust passages (52) to allow exhaust gas passing through the plurality of independent exhaust passages (52) to be collected together; a volume-enlarged portion (62b) provided downstream with respect to the collecting pipe (56); and valve drivers (30, 40) capable of driving the intake valve (19) and the exhaust valve (29) in each of the plurality of cylinders. Among the plurality of independent exhaust passages (52), at least two connected to respective ones of two of the plurality of cylinders, whose exhaust strokes are successive with respect to each other, are connected to the collecting pipe (56) at mutually adjacent positions. The valve drivers (30, 40) are operable, at least in a low engine speed region where engine speed is equal to or less than a preset reference engine speed (N1), to drive the intake valve (19) and the exhaust valve (20) in each of the plurality of cylinders in such a manner that a valve opening period of the intake valve (19) and a valve opening period of the exhaust valve (20) in each of the plurality of cylinders overlap with each other for a predetermined overlap period (T_O/L), and the exhaust valve (20) in a certain one of the plurality of cylinders starts opening during the overlap period (T_O/L) in a preceding one of the remaining cylinders, whose exhaust stroke immediately precedes that of the certain cylinder. Each of at least an upstream portion of the collecting pipe (56) and at least a downstream portion of each of the plurality of independent exhaust passages (52) is formed such that a cross-sectional area thereof gradually decreases toward a downstream direction. The volume-enlarged portion (62b) is formed such that a cross-sectional area thereof is increased as compared to a passage upstream with respect to the volume-enlarged portion (62b), so as to cause a positive pressure wave of exhaust gas which reaches the volume-enlarged portion (62b) after being discharged from each of the plurality of cylinders, to be reflected and converted to a negative pressure wave. A length (L1) between an upstream end of the collecting pipe (56) and an upstream end of the volume-enlarged portion (62b) is set to a dimension which allows a negative pressure wave generated through a phenomenon that a positive pressure wave of exhaust gas discharged from a certain one of the plurality of cylinders is reflected by the volume-enlarged portion (62b) at least at a predetermined engine speed equal to or less than the preset reference engine speed (N1), to reach the exhaust port (18) in a preceding one of the remaining cylinders, whose exhaust stroke immediately precedes that of the certain cylinder, during the overlap period (T_O/L) in the preceding cylinder.

In the above intake and exhaust system, the downstream ends of the plurality of independent exhaust passages extending from respective ones of the plurality of cylinders are connected to the single collecting pipe, and each of the downstream portion of a respective one of the plurality of independent exhaust passages, and the upstream portion of the collecting pipe, is formed such that a cross-sectional area thereof gradually decreases toward the downstream direction, so that, when blowdown gas from a certain one of the cylinders is ejected into the collecting pipe through the independent exhaust passage at high speed, a strong negative pressure can be generated around the ejected gas flow (ejector effect). Further, at least in a low engine speed region where the engine speed is equal to or less than the reference engine speed, the exhaust valve in a certain one of the plurality of cylinders starts opening during the overlap period in a preceding one of the remaining cylinders, whose exhaust stroke immediately precedes that of the certain cylinder, so that it becomes possible to apply a negative pressure generated by the ejector effect to the exhaust port of the preceding cylinder during the overlap period in the preceding cylinder, to effectively promote scavenging in the preceding cylinder.

In the above intake and exhaust system, the length between the upstream end of the collecting pipe and the upstream end of the volume-enlarged portion is appropriately adjusted to, allow a negative pressure wave generated through a phenomenon that a positive pressure wave of exhaust gas discharged from a certain one of the plurality of cylinders is reflected by the volume-enlarged portion at a certain engine speed equal to or less than the reference engine speed, to reach the exhaust port in the preceding one of the remaining cylinder during the overlap period in the preceding cylinder. Thus, the negative pressure wave allows exhaust gas in the preceding cylinder to be sucked toward the exhaust port, so that it becomes possible to further promote scavenging of the preceding cylinder during the overlap period in the preceding cylinder.

In order words, the above intake and exhaust system can promote scavenging of the preceding cylinder by utilizing both of the ejector effect based on exhaust gas discharged from the certain cylinder, and the negative pressure wave generated by reflection of the positive pressure wave of the discharged exhaust gas, so as to effectively increase engine power output.

Preferably, the above intake and exhaust system comprises a catalytic device (6) which includes a catalyst body (64) capable of purifying exhaust gas discharged from the plurality of cylinders, and a casing (62) extending in a direction of exhaust gas flow and housing the catalyst body. The catalyst body (64) is disposed at a position apart from an upstream end of the casing (62) in the downstream direction, and the casing (62) is connected to a downstream end of the collecting pipe (56), wherein a part of the casing (62) located upstream with respect to the catalyst body (64) functions as the volume-enlarged portion (62b).

According to this feature, the upstream end of the casing of the catalytic device functions as the volume-enlarged portion, so that it becomes possible to facilitate structural simplification as compared to cases where the volume-enlarged portion is provided separately from the casing. In addition, a distance between the engine body and the catalyst body can be reduced, so that it becomes possible to increase a temperature of exhaust gas flowing into the catalyst body so as to quickly activate the catalyst.

Preferably, in the above intake and exhaust system, the collecting pipe (56) has a diffuser portion (56d) at a position apart from the downstream ends of the plurality of independent exhaust passages (52) in the downstream direction, wherein the diffuser portion (56d) has a cross-sectional area which gradually increases toward the downstream direction.

According to this feature, an exhaust gas pressure lowered by passing through the upstream portion of the collecting pipe, etc., can be restored within a short passage. In addition, the diffuser portion allows exhaust gas to evenly flow into the catalyst body disposed downstream thereof, so that it becomes possible to sufficiently bring out exhaust gas purification performance of the catalyst body.

Preferably, in the above intake and exhaust system, the length (L1) between the upstream end of the collecting pipe (56) and the upstream end of the volume-enlarged portion (62b) is set to 1 m or less.

Preferably, in the above intake and exhaust system, the upstream portion of the collecting pipe (56) has an inner peripheral surface formed to have a radial dimension greater than that of a cross-sectional shape of an assembly of the downstream ends of the plurality of independent exhaust passages (52).

According to this feature, it becomes possible to suppress exhaust gas from adhering onto the inner wall of the upstream portion of the collecting pipe to cause lowering in flow speed of exhaust gas, so that the ejector effect can be more effectively produced.

The above intake and exhaust system may comprise a bypass passage which extends from a halfway position of each of the plurality of independent exhaust passages (52) to bypass the collecting pipe (56) and is communicated with a passage upstream with respect to the volume-enlarged portion (62b), and a switching valve for selectively opening and closing the bypass passage. In this case, preferably, the switching valve is adapted, in the low engine speed region where the engine speed is equal to or less than the reference engine speed (N1), to be closed, and, in an engine operating region where the engine speed is greater than the reference engine speed (N1), to be opened.

According to this feature, it becomes possible to effectively reduce pumping loss in an engine operating region where the engine speed is relatively high.

The invention claimed is:

1. An intake and exhaust system for a multi-cylinder engine having a plurality of cylinders each provided with an intake port, an exhaust port, an intake valve capable of opening and closing the intake port, and an exhaust valve capable of opening and closing the exhaust port, the intake and exhaust system comprising:
   a plurality of independent exhaust passages each connected to the exhaust port in a respective one of the plurality of cylinders, or the exhaust ports in two or more of the plurality of cylinders, whose exhaust strokes are not successive with respect to each other;
   a collecting pipe connected to downstream ends of the plurality of independent exhaust passages to allow exhaust gas passing through the plurality of independent exhaust passages to be collected together;
   a volume-enlarged portion provided downstream with respect to the collecting pipe; and
   valve drivers capable of driving the intake valve and the exhaust valve in each of the plurality of cylinders,
   wherein:
   among the plurality of independent exhaust passages, at least two connected to respective ones of two of the plurality of cylinders, whose exhaust strokes are successive with respect to each other, are connected to the collecting pipe at mutually adjacent positions;
   the valve drivers are operable, at least in a low engine speed region where engine speed is equal to or less than a preset reference engine speed, to drive the intake valve and the exhaust valve in each of the plurality of cylinders in such a manner that a valve opening period of the intake valve and a valve opening period of the exhaust valve in each of the plurality of cylinders overlap with each other for a predetermined overlap period, and the exhaust valve in a certain one of the plurality of cylinders starts opening during the overlap period in a preceding one of the remaining cylinders, whose exhaust stroke immediately precedes that of the certain cylinder;
   each of at least an upstream portion of the collecting pipe and at least a downstream portion of each of the plurality of independent exhaust passages is formed such that a cross-sectional area thereof gradually decreases toward a downstream direction;
   the volume-enlarged portion is formed such that a cross-sectional area thereof is increased as compared to a passage upstream with respect to the volume-enlarged portion, so as to cause a positive pressure wave of exhaust gas which reaches the volume-enlarged portion after being discharged from each of the plurality of cylinders, to be reflected and converted to a negative pressure wave; and
   a length between an upstream end of the collecting pipe and an upstream end of the volume-enlarged portion is set to a dimension which allows a negative pressure wave generated through a phenomenon that a positive pressure wave of exhaust gas discharged from a certain one of the plurality of cylinders is reflected by the volume-enlarged portion at least at a predetermined engine speed equal to or less than the preset reference engine speed, to reach the exhaust port in a preceding one of the remaining cylinders, whose exhaust stroke immediately precedes that of the certain cylinder, during the overlap period in the preceding cylinder.

2. The intake and exhaust system as defined in claim 1, further comprising a catalytic device which includes a catalyst body capable of purifying exhaust gas discharged from the plurality of cylinders, and a casing extending in a direction of exhaust gas flow and housing the catalyst body,
   wherein:
   the catalyst body is disposed at a position apart from an upstream end of the casing in the downstream direction;
   the casing is connected to a downstream end of the collecting pipe; and
   a part of the casing located upstream with respect to the catalyst body functions as the volume-enlarged portion.

3. The intake and exhaust system as defined in claim 2, wherein the collecting pipe has a diffuser portion at a position apart from the downstream ends of the plurality of independent exhaust passages in the downstream direction, the diffuser portion having a cross-sectional area which gradually increases toward the downstream direction.

4. The intake and exhaust system as defined in claim 3, wherein the length between the upstream end of the collecting pipe and the upstream end of the volume-enlarged portion is set to 1 m or less.

5. The intake and exhaust system as defined in claim 4, wherein the upstream portion of the collecting pipe has an inner peripheral surface formed to have a radial dimension greater than that of a cross-sectional shape of an assembly of the downstream ends of the plurality of independent exhaust passages.

6. The intake and exhaust system as defined in claim 5, further comprising a bypass passage which extends from a halfway position of each of the plurality of independent exhaust passages to bypass the collecting pipe and is communicated with a passage upstream with respect to the volume-enlarged portion, and a switching valve for selectively opening and closing the bypass passage, wherein the switching valve is adapted, in the low engine speed region where the engine speed is equal to or less than the reference engine speed, to be closed, and, in an engine operating region where the engine speed is greater than the reference engine speed, to be opened.

7. The intake and exhaust system as defined in claim 1, wherein the length between the upstream end of the collecting pipe and the upstream end of the volume-enlarged portion is set to 1 m or less.

8. The intake and exhaust system as defined in claim 7, wherein the upstream portion of the collecting pipe has an inner peripheral surface formed to have a radial dimension greater than that of a cross-sectional shape of an assembly of the downstream ends of the plurality of independent exhaust passages.

9. The intake and exhaust system as defined in claim 8, further comprising a bypass passage which extends from a halfway position of each of the plurality of independent exhaust passages to bypass the collecting pipe and is communicated with a passage upstream with respect to the volume-enlarged portion, and a switching valve for selectively opening and closing the bypass passage, wherein the switching valve is adapted, in the low engine speed region where the engine speed is equal to or less than the reference engine speed, to be closed, and, in an engine operating region where the engine speed is greater than the reference engine speed, to be opened.

10. The intake and exhaust system as defined in claim 1, wherein the upstream portion of the collecting pipe has an inner peripheral surface formed to have a radial dimension greater than that of a cross-sectional shape of an assembly of the downstream ends of the plurality of independent exhaust passages.

11. The intake and exhaust system as defined in claim 10, further comprising a bypass passage which extends from a halfway position of each of the plurality of independent exhaust passages to bypass the collecting pipe and is communicated with a passage upstream with respect to the volume-enlarged portion, and a switching valve for selectively opening and closing the bypass passage, wherein the switching valve is adapted, in the low engine speed region where the engine speed is equal to or less than the reference engine speed, to be closed, and, in an engine operating region where the engine speed is greater than the reference engine speed, to be opened.

12. The intake and exhaust system as defined in claim 1, further comprising a bypass passage which extends from a halfway position of each of the plurality of independent exhaust passages to bypass the collecting pipe and is communicated with a passage upstream with respect to the volume-enlarged portion, and a switching valve for selectively opening and closing the bypass passage, wherein the switching valve is adapted, in the low engine speed region where the engine speed is equal to or less than the reference engine speed, to be closed, and, in an engine operating region where the engine speed is greater than the reference engine speed, to be opened.

\* \* \* \* \*